May 11, 1954  F. WRIGHT  2,678,225
TURNBUCKLE
Filed Dec. 26, 1950  2 Sheets-Sheet 1
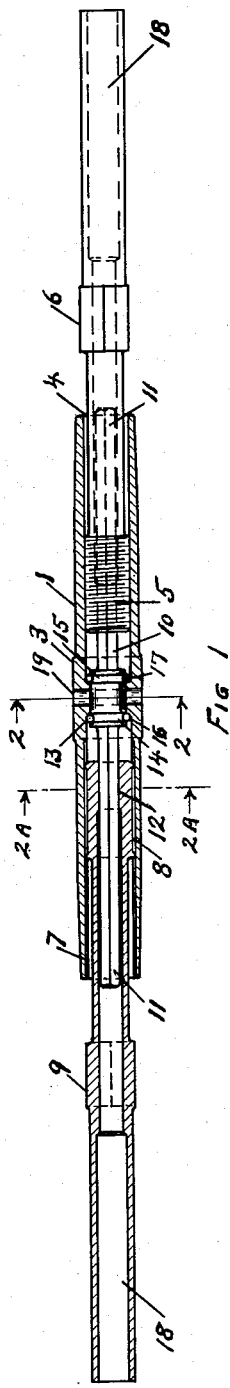
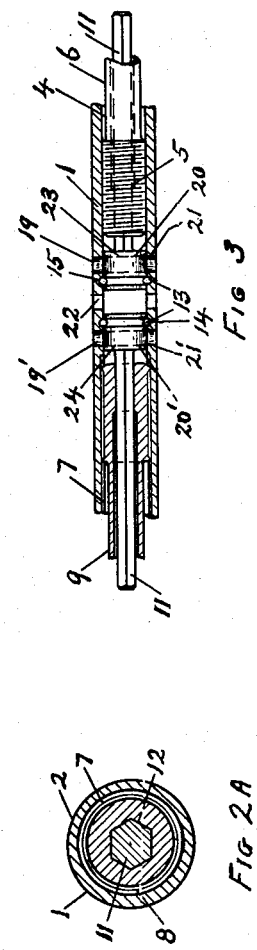
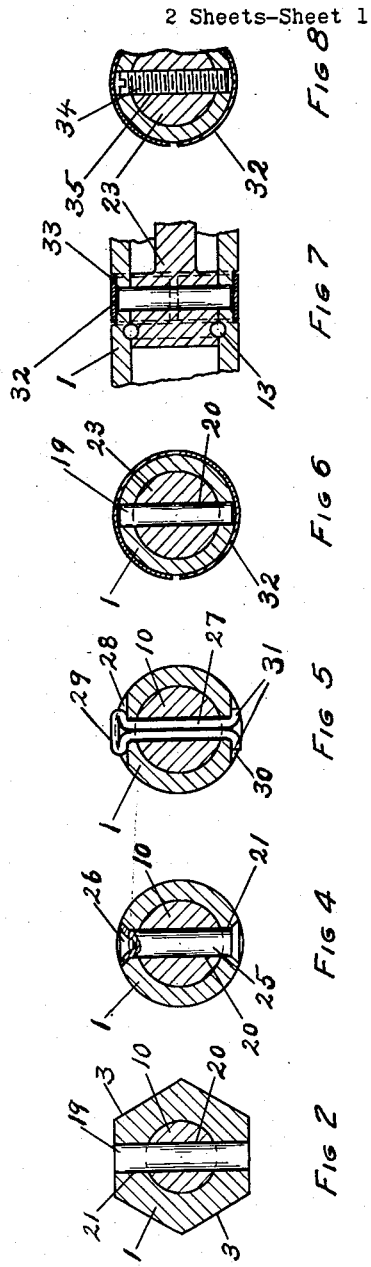
INVENTOR
FRANK WRIGHT
BY S. Tierney Jr.

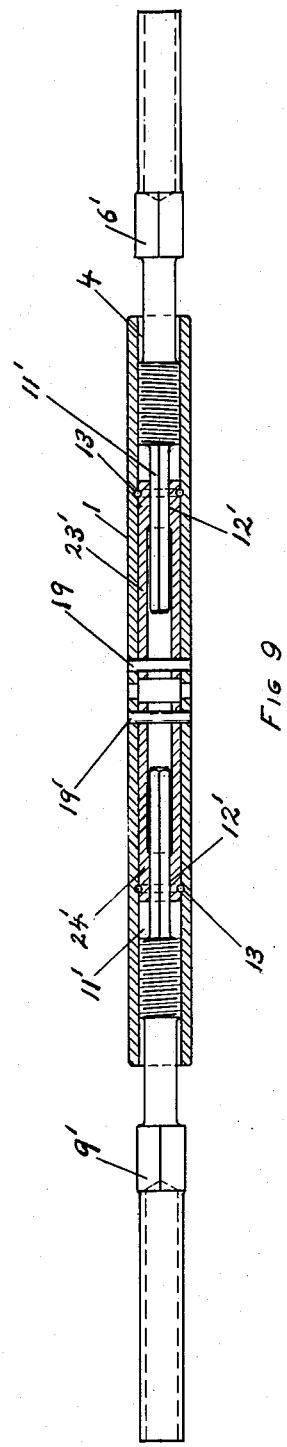
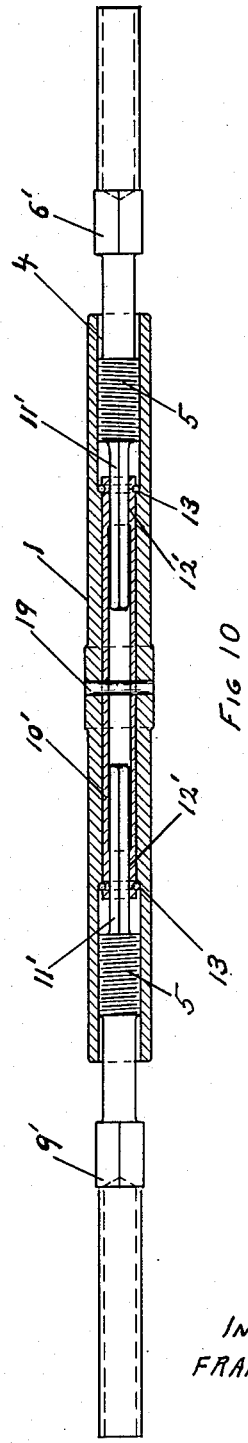

Patented May 11, 1954

2,678,225

UNITED STATES PATENT OFFICE 2,678,225

TURNBUCKLE

Frank Wright, Moreno, Calif.; Ben F. White, administrator of said Frank Wright, deceased Application December 26, 1950, Serial No. 202,679

8 Claims. (Cl. 287—60)

This invention relates to turnbuckles and an object is to provide a turnbuckle of adequate strength yet which is of such small size and weight that it is inexpensive to construct. Also, due to its small size, a number of turnbuckles and their connected cables may be mounted within a small space, such as the wing of an airplane.

Another object is to provide a turnbuckle having a centrally disposed housing which is rotated to effect its adjustment, this housing surrounding and protecting its other operating parts and also serving as part of a locking means to lock the turnbuckle in any adjusted position.

The housing is provided with screw threaded ends which engage threaded ends on two driven members which are drawn together to tighten the wire or cable in which the turnbuckle is connected. A feature of the invention relates to the provision of one or more guide members within the housing which have sliding engagement with the driven members and guide them axially of the housing so that the threads on their ends come into proper engagement with the threads on the ends of the housing as the turnbuckle is assembled. The sliding engagement is preferably provided by non-circular cooperating parts on the guide and driven members which prevent relative rotation of these parts.

A further object of the invention is the utilization of the guide member or members as part of a locking means for locking the turnbuckle in its adjusted position. By fastening the housing and guide members together, the turnbuckle and its driven members are effectively locked in their adjusted positions. If this fastening were effected by any means which extended for a distance beyond the confines of the housing, there would be danger of the fastening means catching on an adjacent turnbuckle or other nearby structure as the cable was moved and thus interfering with its operation. It is accordingly a feature of the invention that the fastening means preferably does not extend beyond the portion of the housing having the greatest periphery so that it does not interfere with the operation of the cable.

A still further object of the invention is the provision of one or more sets of steel balls to prevent movement of the guide member or members axially of the housing. The ball races are designed so that it is not necessary to cut grooves of substantial depth in the housing which would weaken it and thus reduce the strength of the turnbuckle.

Other objects of the invention will become apparent as the description thereof proceeds. For a better understanding of the invention, reference is made to the accompanying drawings in which similar parts are denoted by the same reference numerals.

Fig. 1 is a partial sectional view through the axis of a turnbuckle embodying the invention, Fig. 2 is a section on an enlarged scale through line 2—2 of Fig. 1, Fig. 2A is a section on an enlarged scale through line 2A—2A of Fig. 1, Fig. 3 is a partial section through the axis of a turnbuckle showing a modified form of the invention, Figs. 4 to 8 show a number of variations of means for locking the turnbuckle, and Figs. 9 and 10 are partial sectional views showing further modifications of the invention.

Referring to Figs. 1, 2 and 2A, a turnbuckle is shown comprising a metal housing 1 whose end portions are circular as indicated at 2 and whose center portion 3 is hexagonal so that it may be rotated by a wrench. The interior of housing 1 has a screw thread 4 adapted to engage a thread 5 formed on a driven member 6, also a screw thread 7 adapted to engage a thread 8 on a second driven member 9. The threads 4 and 7 are of opposite hand so that rotation of housing 1 causes driven members 6 and 9 to be drawn together or moved apart in accordance with the direction of rotation. Mounted within housing 1 is a guide 10 having hexagonal shaped ends 11 which have a sliding fit in correspondingly shaped holes 12 formed in driven members 6 and 9. It will be noted that the guide portions 11 extend somewhat beyond the ends of housing 1 and serve as guides to guide the threads 5 and 8 into proper engagement with threads 4 and 7 respectively as driven members 6 and 9 are moved up to housing 1 in the assembly of the turnbuckle. Member 10 is prevented from axial motion within housing 1 by means of sets of balls 13 in raceways 14, 15 formed in member 10, the balls bearing against curved tracks 16, 17 cut in housing 1. The ends of the wire or cable (not shown) to be tightened are secured by any known means in holes 18 formed in driven members 6—9.

To tighten the cable, the hexagonal portion 3 is gripped by a wrench and housing 1 rotated until the desired degree of tension is secured. The turnbuckle is then locked by driving a pin 19 having a tight fit in a hole 20 in member 10, the pin also passing through a hole 21 formed in housing 1. It is an advantage of this construction that there is nothing extending beyond the periphery of housing 1 to catch on adjacent structure and thereby interfere with the free movement of the turnbuckle and cable.

Fig. 3 shows a modification in which housing 1 is of cylindrical shape and at its center is provided with a circular hole 22 through which a long cylindrical pin (not shown) may be passed and used as a tool to rotate the housing. Instead of a single guide member, two separate members 23, 24 are provided which have hexagonal guide portions 11 extending into and guiding driven members 6 and 9 in the same manner as above described. Axial motion of guide members 23, 24 is prevented by a set of balls 13 in a raceway 15 in member 23 and the balls 13 in raceway 14 in member 24. The turnbuckle is locked by a cylindrical pin 19 passing through a hole 21 in housing 1 and a hole 20 in member 23 and a similar pin 19' passing through a second hole 21' in housing 1 and a hole 20' in member 24. It will be understood that the hexagonal guide members 11 guide the driven members 6 and 9 axially of housing 1 so that their external threads are brought into correct engagement with the interior threads 4 and 7 of the housing.

Figs. 4 to 8 show alternative means for locking the turnbuckles herein described. In Fig. 4 a hollow headed rivet 25 is shown passing through a hole 21 in housing 1 and hole 29 in guide member 10. The hollow end 26 of the rivet is expanded, as shown, after insertion to hold the rivet securely in place. The ends of hole 21 are suitably shaped, as shown, to accommodate the ends of the rivet.

The locking means of Fig. 5 comprises a flat headed cotter pin 27, the top of housing 1 being cut away, as at 28, to receive the head 29 of the pin and the bottom of the housing cut away, as at 30, to receive the bent over ends 31 of the pin. In this way the pin does not extend to any substantial extent beyond the periphery of housing 1 and will not interfere with its free movement.

The housing 1 of Figs. 6 and 7 is locked by means of a cylindrical pin 19 which has a snug or driving fit in hole 20 of guide member 23. As an added safeguard to prevent the pin from dropping out due to vibration of an airplane or other cause, a spring retaining ring 32 surrounds the pin and is seated in a groove 33 cut in housing 1. This construction assures certain locking of the turnbuckle without the use of any part projecting beyond its periphery which might interfere with its free movement. The construction shown in Fig. 8 is similar to that of Figs. 6–7 except that a screw 34 set in a threaded hole 35 formed in guide member 23 replaces the pin 19. The retaining ring 32 assures retention of the screw in locking position if, for any reason, it were to work loose.

The construction shown in Figs. 9 and 10 are the opposite of those shown in Figs. 3 and 1 respectively. In both cases the hexagonal guide rods 11' are formed on the inner ends of driven members 6' and 9'. In Fig. 9 guide rods 11' enter hexagonal holes 12' formed in a pair of guide members 23' and 24' which receive the pins 19, 19' to lock the turnbuckle. Sets of steel balls 13 serve to prevent axial motion of members 23', 24' as above explained in connection with Fig. 3. In Fig. 10 the hexagonal holes 12' which receive the guide rods 11' are formed in the ends of a single guide member 10' whose motion axially of the housing 1 is prevented by sets of balls 13, as shown. The turnbuckle is locked by means of a single locking pin 19. In the construction of both Figs. 9 and 10, the guide rod 11' enters a hexagonal hole 12' as the turnbuckle is assembled and guides the exterior thread 5 of each driven member into proper threaded engagement with an interior thread 4 at the end of housing 1.

Having described its construction, this application is intended to cover all changes and modifications of the examples of the invention herein chosen for purposes of the disclosure, which do not constitute departures from the spirit and scope of the invention.

I claim:

1. A turnbuckle comprising a hollow housing having its ends interiorly threaded, the thread at one end being of opposite hand to that at the other and the center portion of the housing being shaped to receive a tool to rotate it, a pair of driven members each having an end threaded for engagement with a thread of the housing; guide means supported within the housing and having spaced apart flat guide surfaces extending parallel to the axis of the housing, said driven members having at their ends plane guide portions arranged, upon moving said driven members toward the housing, to come into engagement with and slide along said guide surfaces before and while the threads on the driven members come into engagement with the threads of the housing, whereby upon further movement of said driven members towards the housing, registration of the threads of the driven members with the threads of the housing is secured, means comprising a plurality of balls in contact with said housing for continually preventing the displacement of said guide means axially of the housing and removable means for securing said guide means to the housing and thereby lock the turnbuckle in an adjusted position.

2. A turnbuckle as claimed in claim 1 in which said guide means comprises a cylindrical portion bearing against the interior surface of the housing, said cylindrical portion having a raceway in contact with said balls.

3. A turnbuckle as claimed in claim 1 in which the housing and guide means are provided with aligned holes and the removable means for securing the guide means to the housing comprises a pin passing through said aligned holes and having it's ends disposed within the periphery of the housing when the turnbuckle is locked.

4. A turnbuckle as claimed in claim 1 in which the housing and guide means are provided with aligned holes and the removable means for securing the guide means to the housing comprises a pin passing through said aligned holes, and a snap ring extending around the housing and covering the ends of said pin.

5. A turnbuckle as claimed in claim 1 in which said guide means comprises two separate members each having a raceway and several of said balls are seated in each of said raceways.

6. A turnbuckle as claimed in claim 1 in which the housing and guide means are provided with aligned holes, the hole in the guide means being threaded and the removable means for securing the guide means to the housing comprises a screw passing through said aligned holes and having a thread engaged with the thread of the hole in the guide means.

7. A turnbuckle as claimed in claim 1 in which the housing and guide means are provided with aligned holes and the removable means for securing the guide means to the housing comprises a metallic member disposed in the aligned holes and having a bent-over end portion adapted to retain it in position.

8. A turnbuckle comprising a housing having its ends interiorly threaded, the thread at one end being of opposite hand to that at the other and the center portion of the housing being provided with a transverse hole, a pair of driven members each having an end threaded for engagement with a thread of the housing, a unitary guide member supported within the housing and having a transverse hole disposed for alignment with the hole in the housing, a locking member passing through said holes to lock the guide member to the housing, said guide member having spaced apart flat guide surfaces extending parallel to the axis of the housing and said driven members having at their ends plane guide portions arranged, upon moving said driven members toward the housing, to come into engagement with and slide along said guide surfaces before and while the threads on the driven members engage the threads of the housing, whereby upon further movement of said driven members towards the housing, registration of the threads of the driven members with the threads of the housing is secured; said housing being provided with spaced apart ball races, and sets of balls in said races and bearing against the periphery of said guide member so as to prevent axial displacement of said guide member within the housing.

References Cited in the file of this patent

UNITED STATES PATENTS

| Number | Name | Date |
| --- | --- | --- |
| 1,366,732 | Hoyt | Jan. 25, 1921 |
| 1,480,253 | Fisher | Jan. 8, 1924 |
| 2,299,526 | Claud-Mantle | Oct. 20, 1942 |
| 2,352,585 | Camburn | June 27, 1944 |
| 2,354,474 | Noble | July 25, 1944 |
| 2,412,566 | De Bell | Dec. 17, 1946 |
| 2,420,363 | Espenas | May 13, 1947 |
| 2,420,364 | Espenas | May 13, 1947 |